United States Patent [19]

Chu et al.

[11] 4,100,135

[45] Jul. 11, 1978

[54] NOVEL ELASTOMERS AND IMPROVED WATERLESS LITHOGRAPHIC PRINTING MASTERS

[75] Inventors: Joseph Y. C. Chu, Fairport; Richard L. Schank, Webster, both of N.Y.

[73] Assignee: Xerox Corporation, Stamford, Conn.

[21] Appl. No.: 791,353

[22] Filed: Apr. 27, 1977

[51] Int. Cl.$^2$ ............................................. C08G 77/04
[52] U.S. Cl. ................................ 528/11; 260/46.5 E; 427/54; 428/447; 428/450
[58] Field of Search ...................... 260/46.5 E, 46.5 G

[56] References Cited

U.S. PATENT DOCUMENTS 3,583,939  6/1971  Bostick et al. ................. 260/46.5 E
3,705,911  12/1972  Thomson ...................... 260/46.5 G

*Primary Examiner*—Melvyn I. Marquis

[57] ABSTRACT

Waterless lithographic printing masters of improved contrast are provided by a coating suitable master substrate with a silicone elastomer gum having reactive pendant hydroxyl or amino groups, reacting a photo and/or thermally reactive azide with said pendant groups, depositing a particulate image pattern on said silicone comprising a thermoplastic organohydrocarbon polymer and crosslinking said silicone and chemically bonding said organohydrocarbon to said silicone to form a durable imaged waterless lithographic printing master.

6 Claims, No Drawings

NOVEL ELASTOMERS AND IMPROVED WATERLESS LITHOGRAPHIC PRINTING MASTERS

BACKGROUND OF THE INVENTION

This invention relates to a novel elastomer and to waterless lithographic masters of the planographic type.

In conventional lithography, an aqueous fountain solution is employed to prevent the ink from wetting the nonimaged areas of the planographic plate. It has recently been discovered that the requirement for a fountain solution can be obviated by employing a planographic plate having a silicone, i.e. organopolysiloxane, elastomeric layer. Because the silicone is not wetted by the printing ink, no fountain solution is required. While the use of silicone elastomers as a printing surface has obviated the requirement for a fountain solution, it has been found that finely divided particulate material commonly referred to in the trade as "toner", is not easily attached to the silicone. Thus, the abhesive or nonadhesive property of the silicone which renders it useful for rejecting lithographic inks, also causes it to reject other materials such as toner. Accordingly, it has been difficult to prepare a priting master in which the toner could be sufficiently attached to the silicone such that it would not become removed after a short run on a printing press.

BRIEF DESCRIPTON OF THE INVENTION

It has now been discovered that conventional xerographic toner polymeric images can be chemically bonded to abhesive silicone polymer films by incorporating photo and/or thermally reactive azide pendant sites in said silicone polymer films which can be activated upon photo and/or thermal activation. The reactive azide ($-RSO_2-N_3$) pendant site decomposes by a photo or a thermal excitation to form the highly reactive nitrene ($-RSO_2\ddot{N}$) which leads to crosslinking within the silicone polymer itself and insertion in the carbon-hydrogen bonds present in the toner polymer in contact with the silicone surface so as to bond the toner to said silicone surface.

These reactive silicone films are more strongly bonded to conventional substrates which is believed to be due to the highly reactive nitrene groups which are generated by the thermal and/or photo activation.

DETAILED DESCRIPTION OF THE INVENTION

Typical materials which include the types of master materials as well as instructions for preparing the masters are herein discussed in detail.

Substrates which can be employed for the printing master are those self-supporting materials to which the copolymer can adhere and be compatible therewith as well as possess sufficient heat and mechanical stability to permit use under widely varying conditions. Exemplary of suitable substrates are paper; metals such as aluminum; plastics such as polyesters, polycarbonates, polysulfones, nylons and polyurethanes.

When a substrate which is nonphotoconductive is employed, the substrate can be coated with a photoconductive material by conventional means such as draw bar coating, vacuum evaporation and the like. A thickness of between 0.02 and 20 microns is conventional. Typical inorganic crystalline photoconductors include cadmium sulfide, cadmium sulfoselenide, cadmium selenide, zinc sulfide, zinc oxide and mixtures thereof. Typical inorganic photoconductive materials include amorphous selenium, and selenium alloys such as selenium-tellurium, and selenium-arsenic. Selenium may also be used in its hexagonal crystalline form, commonly referred to as trigonal selenium. Typical organic photoconductors include phthalocyanine pigments such as the X-form of metal free phthalocyanine described in U.S. Pat. No. 3,357,989 to Byrne et al, and metal phthalocyanine pigments, such as copper phthalocyanine. Other typical organic photoconductors include poly(vinyl carbazole), trinitrofluorenone and photo-injecting pigments such as benzimidazole pigments, perylene pigments, quinacridone pigments, indigoid pigments and polynuclear quinones. Alternatively, the photoconductor can be dispersed in a binder of one of the aforesaid polymeric substrate materials to serve as the ink accepting substrate.

Silicone elastomers which can be employed are those which have reactive crosslinking sites and are capable of being cured to an ink releasing elastomeric condition. Exemplary of suitable silicone gums are those having only methyl containing groups in the polymer chain, such as poly(dimethylsiloxane); gums having both methyl and phenyl containing groups in the polymer chain, as well as gums having both methyl and vinyl groups, methyl and fluorine groups or methyl, phenyl and vinyl groups in the polymer chain with pendant hydroxyl or primary or secondary amino groups.

Azides which can be employed in the invention are those which are thermally and/or photo reactive to the silicone and preferably to the toner or thermoplastic organohydrocarbon imaging material. Further, the thermally reactive azides are stable at ambient temperature (20°-30° C). Exemplary of suitable azides are represented by the formula

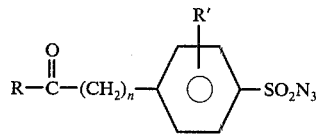

wherein R is chloro or hydroxyl, R' is chloro, cyano hydrogen or nitro or an alkyl of from 1-8 carbon atoms and $n$ is an integer of from 0-20.

A preferred azide is p-carboxybenzenesulfonyl azide. Only a minor amount need be employed to react with at least some of the pendant sites on the silicone. Preferably, enough azide is employed to react with all of the reactive sites on the silicone which generally comprise between about 0.1% and about 10.0% of the silicone. The silicone and azide can be reacted in a suitable solvent such as benzene, anhydrous ether and the like and agitated at room temperature for from 12 to 24 hours in accordance with the general procedure of Examples I and III.

To prepare a master, the reaction product in a suitable solvent can then be coated on the substrate by conventional means such as draw bar coating, and the solvent allowed to evaporate. The master can be imaged by conventional means such as electrostatographic imaging, either directly on the master and developed thereon, or formed and developed on a separate photoconductive surface and transferred to the master surface. The particulate imaging material can be any conventional ink accepting material commonly referred to in the art as toner. Typical toners include thermoplastic polymers such as polyethylene, polyesters and polymers of styrene. Typical polymers of styrene include polystyrene, styrene/n-butyl methacrylate copolymer and styrene-butadiene copolymer. Other materials which can be employed include: polypropylene, poly(α-methylstyrene), poly(hexamethylene sebacate), ethylene-vinyl acetate copolymers, polyamides, polyimides, phenoxies, polyesters and vinyls. After the master is imaged, the particulate material can be fixed by heating the master to soften the thermoplastic imaging material to cause the azido pendant sites on the silicone to become decomposed and lead to the formation of highly reactive nitrene species which by an insertion reaction strongly bond to the imaging material and the substrate. Typically, the imaging toners contain pigments and thus heat is a convenient means to bond the toner to the silicone and also crosslink the silicone. If a toner is used containing no pigment, then UV light can be employed.

The imaged printing master can then be employed on conventional planographic printing equipment by direct or offset means with the dampening system removed to provide good quality prints over an extended period of operation with conventional inks of the oleophilic, glycol or rubber based type.

The following examples will serve to illustrate the invention and embodiments thereof. All parts and percentages in said examples and elsewhere in the specification and claims are by weight unless otherwise specified.

EXAMPLE I

Into a 4 oz. round glass bottle is placed 50.0 grams of a 10 weight percent solution of Union Carbide Y-3557 silicone gum (containing 0.5 weight percent $H_2N(CH_2)_4CH_3SiO$) in benzene, 0.15 gram of p-carboxybenzenesulfonyl azide in tetrahydrofuran and 0.2 gram of 4A molecular sieve. The mixture was allowed to stand at room temperature for 24 hours and was found not reactive toward a polyisocyanate indicating the absence of free amino groups.

EXAMPLE II

The solution of Example I was draw bar coated onto a grained aluminum plate and allowed to air dry to a dry film thickness of about 3-4 microns. The plate was then exposed to an imaged mask for 5 minutes using a 10 watt UV lamp. Removal of the unexposed areas was obtained by washing with acetone to reveal the insoluble crosslinked silicone regions which had been exposed to the UV light. These crosslinked polymer areas were found to be tightly bonded to the aluminum substrate.

EXAMPLE III

The general procedure of Example I was repeated employing 10.0 grams of Union Carbide Y-3557 silicone gum in 200 cc. of anhydrous ether, 0.0955 gram of p-carboxybenzenesulfonyl azide and 0.0866 gram of dicyclohexylcarbodiimide. The mixture was stirred at room temperature for 12 hours and filtered. The reaction product was found not reactive towards a polyisocyanate, indicating the absence of free amino groups.

EXAMPLE IV

The solution of Example III was draw bar coated onto a grained aluminum plate and allowed to air dry to a dry film thickness of about 3-4 microns. The plate was then exposed to an imaged mask for 5 minutes using a 10 watt UV lamp. Removal of the unexposed areas was obtained by washing with acetone to reveal the insoluble crosslinked silicone regions which had been exposed to the UV light. These crosslinked polymer areas were found to be tightly bonded to the aluminum substrate.

EXAMPLES V-VI

The solutions of Examples I and III were each draw bar coated on an aluminum substrate by the procedure of Example II. The plates were placed in an air oven at 175° C for several minutes. The films were found to be highly crosslinked and firmly bonded to the substrate.

EXAMPLES VII-VIII

To the solutions of Examples I and III was added 5 weight percent benzophenone sensitizer. The exposure times were reduced to 30-60 seconds with the same results as said Examples II and IV.

EXAMPLES IX-X

The polymers of Examples I and III containing sulfonyl azide reactive pendant sites were each draw bar coated on aluminum plates from a 10 weight percent solution in benzene to a dry film thickness of about 3-4 microns. The films were allowed to dry for several hours at room temperature and a nonpigmented 2400 Xerox toner line copy image prepared and electrostatically transferred to the silicone surface. The dry toner image was fused by heating the plate at a temperature of 175° C for 5 seconds. The entire plate was then exposed to a 450 watt UV lamp for 8 minutes to crosslink the silicone film and chemically bond the toner image by means of the nitrene insertion reaction into the carbon-hydrogen bonds in the toner polymer. The silicone polymer was found to be crosslinked and firmly bonded to the aluminum substrate and the toner bonded to the silicone surface as indicated by its failure to be removed by the pulling action of Scotch tape. The plate was mounted on a Davidson Press operating in the direct mode with Ronico Rubber Base Lithographic Ink and high contrast copies obtained.

EXAMPLES XI-XII

The procedure of Examples IX and X were repeated but for the exception that a pigmented 2400 Xerox Toner was employed and the toner image bonded to the film and the film crosslinked by thermal exposure of the plates for five minutes at 175° C. Similar printing results were obtained.

EXAMPLE XIII

The previous examples are repeated employing polydimethylsiloxane elastomers with 0.1 and 10% pendant hydroxyl groups and with azides of the formula (supra) having chloro, nitro and cyano substituents and alkyl groups of from 10 and 20 carbons. Similar results are obtained.

Having described the present invention with reference to these specific embodiments, it is to be understood that numerous variations can be made without departing from the spirit of the invention and it is intended to encompass such reasonable variations or equivalents within its scope.

What is claimed is:

1. A process for preparing a silicone polymer comprising (a) providing a silicone elastomer gum having from 0.1 to 10% pendant hydroxyl or primary or secondary amino groups,
(b) providing an azide stable at ambient temperature in an amount sufficient to react with said pendant groups wherein the azide employed is of the formula

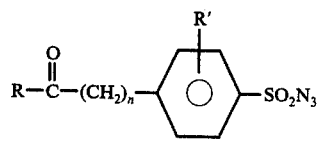

wherein R is chloro or hydroxyl, R' is chloro, cyano, hydrogen or nitro or an alkyl of from 1-8 carbon atoms and *n* is an integer of from 0-20 and
(c) reacting said azide with said silicone.

2. The process of claim 1 wherein the silicone employed has pendant primary amino groups.

3. The process of claim 1 wherein the azide is p-carboxybenzenesulfonyl azide.

4. The process of claim 1 wherein the silicone is polydimethylsiloxane with pendant primary amino groups.

5. The process of claim 1 wherein the silicone is polydimethylsiloxane having pendant primary amino groups, and the azide is p-carboxybenzenesulfonyl azide.

6. An ink releasing elastomer obtained by a process which comprises providing a silicone elastomer having from 0.1 to 10% hydroxyl or primary or secondary amino groups and an azide stable at ambient temperature which is reactive with said pendant groups is an amount sufficient for reaction with said groups, wherein the azide employed is of the formula

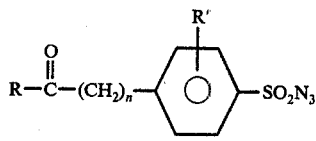

wherein R is chloro or hydroxyl, R' is chloro, cyano, hydrogen or nitro or an alkyl of from 1-8 carbon atoms and *n* is an integer of from 0-20, and reacting said azide with said silicone.

* * * * *